J. GUNTHER.
COOLING INTERNAL COMBUSTION ENGINES.
APPLICATION FILED DEC. 6, 1911.
1,124,424.
Patented Jan. 12, 1915.
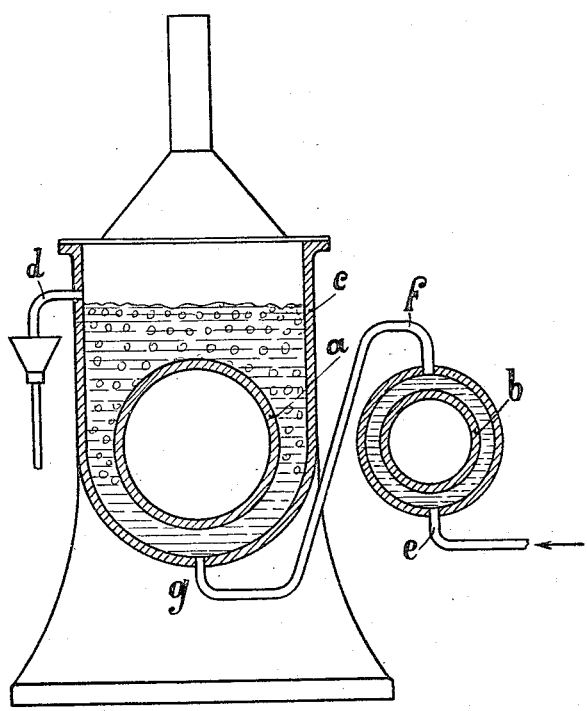
Witnesses:
John C. Sanders
Albert F. Heumann
Inventor:
Jacob Gunther
BY
Attorney:

UNITED STATES PATENT OFFICE.

JACOB GUNTHER, OF BERGISCH-GLADBACH, GERMANY.

COOLING INTERNAL-COMBUSTION ENGINES.

1,124,424.  Specification of Letters Patent.  Patented Jan. 12, 1915.

Application filed December 6, 1911. Serial No. 664,288.

*To all whom it may concern:*

Be it known that I, JACOB GUNTHER, a subject of the Emperor of Germany, residing at Bergisch-Gladbach, Germany, have invented certain new and useful Improvements in Cooling Internal-Combustion Engines, of which the following is a specification.

It is well-known that the working cylinders of internal combustion engines can be cooled either by the circulation of a cooling medium or by evaporation. In the latter case the cylinder must be directly connected with a receiver of sufficient capacity to permit of the separation of the steam from the water so that no considerable amount of the latter is carried over with the steam. Cooling by evaporation, which does not necessitate the use of a return cooling plant and entails a small consumption of cooling water, has not hitherto been used with that type of internal combustion engines which require an auxiliary compressor, such as for example, the Diesel engine, because not only the power cylinder but also the compressor requires cooling and for the latter the use of a circulating cooling medium only can be considered involving the circulation of at least 4 liters per horse-power-hour. For this reason cooling by circulation has been employed for both cylinders, the water being driven first through the jacket of the compressor and then through that of the working cylinder. It has also been practically demonstrated that cooling by evaporation for the cylinder of the compressor is unsuitable as it is not sufficiently effective and in consequence the efficiency of the compressor is too much reduced.

The present invention has for its object to combine in practice cooling by circulation, which is necessary for the compressor, with cooling by evaporation which is permissible for the Diesel engine. To this end the discharge pipe from the jacket of the compressor for the cooling water, is connected to the lower part of the jacket of the Diesel engine, the admission of cooling water to the compressor being such as is just required to keep the compressor cool at the necessary temperature that is to say such as to maintain a discharge temperature of about 40° C. Under these conditions the water in the jacket of the Diesel engine will boil; nevertheless less water will be evaporated than would have been necessary for a sufficient cooling of the compressor. The Diesel engine provided with a device for cooling by evaporation must however at the same time be provided with an overflow pipe so as to allow the superfluous boiling water to flow off. In this manner less cooling water will naturally be used than if the Diesel engine alone had been provided with a separate evaporating device and the compressor cooled by a separate circulating system as in this case the water leaving the compressor would be discharged with a temperature of about 40° only, so that its capacity for taking up heat would not be utilized to so great an extent as when it is conducted to the Diesel engine. On the other hand very considerably less water will be used than if, as is usual, the Diesel engine is also provided with a circulating cooling system and such a large volume of cooling water is used that no evaporation takes place in the jacket of the Diesel engine.

The accompanying drawing shows diagrammatically a cross-section of the cylinder of a horizontal Diesel engine $a$ and of the cylinder of the corresponding compressor $b$. Connected in the Diesel engine $a$ is an evaporating vessel $c$ which is provided with an overflow pipe $d$. The inlet pipe $e$ for the water is connected to the jacket of the compressor cylinder $b$, the discharge pipe $f$ of which is connected to the inlet $g$ of the jacket of the cylinder $a$ of the Diesel engine.

What I claim and desire to secure by Letters Patent is:—

1. In an internal combustion engine connected with an auxiliary compressor the combination of a cooling device for the engine consisting of an evaporation tank of relatively large capacity, a cooling jacket of relatively small capacity for the compressor, and means for connecting the outlet of the said cooling jacket with the inlet of the said evaporation tank, substantially as set forth.

2. In an internal combustion engine connected with an auxiliary compressor the combination of the engine cylinder with an evaporation tank of relatively large capacity, said tank surrounding said engine cylinder and having an overflow pipe, a compressor, a cooling jacket of relatively small capacity for the compressor cylinder, and a pipe connecting the outlet of the said cooling jacket with the inlet of the said evaporation tank, all substantially as described.

In testimony whereof I have affixed my signature in presence of two witnesses.

JACOB GUNTHER.

Witnesses:
NICOLAUS MÜNSTER,
BENNO RÜLF.